(12) United States Patent
Sugaya

(10) Patent No.: US 10,752,356 B2
(45) Date of Patent: Aug. 25, 2020

(54) MOVING DEVICE, MOVING DEVICE CONTROL METHOD, PROGRAM, AND MOVING DEVICE CONTROL SYSTEM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/461,027

(22) PCT Filed: Jan. 24, 2017

(86) PCT No.: PCT/JP2017/002321
§ 371 (c)(1),
(2) Date: May 15, 2019

(87) PCT Pub. No.: WO2018/138771
PCT Pub. Date: Aug. 2, 2018

(65) Prior Publication Data
US 2019/0329885 A1    Oct. 31, 2019

(51) Int. Cl.
G05D 1/00   (2006.01)
B64C 39/02  (2006.01)
G06K 7/14   (2006.01)

(52) U.S. Cl.
CPC .......... B64C 39/024 (2013.01); G06K 7/1417 (2013.01); *B64C 2201/123* (2013.01); *B64C 2201/126* (2013.01); *B64C 2201/127* (2013.01)

(58) Field of Classification Search
CPC ............. B64C 39/02; G05D 1/10; G06K 7/14
(Continued)

(56) References Cited

U.S. PATENT DOCUMENTS 10,049,589 B1 *   8/2018   Boyd ................. B64D 47/08
10,289,116 B1 *   5/2019   Dunn .................. G05D 1/0088
(Continued)

FOREIGN PATENT DOCUMENTS

JP    06187032       7/1994
JP    2000053395     2/2000
(Continued)

OTHER PUBLICATIONS

JPO, Office Action of JP 2018-563965 dated Nov. 19, 2019.
JPO, Office Action JP 2018-563965 dated Sep. 3, 2019.

*Primary Examiner* — Tan Q Nguyen
(74) *Attorney, Agent, or Firm* — Lex IP Meister, PLLC

(57) ABSTRACT

Moving device identification information, i.e., identification information for identifying moving device 20 and operation information for specifying an operation to be performed by moving device 20 is encoded into a two-dimensional code. Image analyzing unit 25 analyzes a captured image to obtain the moving device identification information and an address of operation information. Operation information requesting unit 26 requests actual operation information from operation information storage device 10 by designating the address of operation information. Operation information storage unit 11 stores the actual operation information. Operation information transmitting unit 22 transmits the actual operation information to moving device 20 in response to the request from operation information requesting unit 26. Operation executing unit 22 acquires the moving device identification information and the actual operation information based on the captured image, and performs the operation specified by the operation information when the moving device identification information indicates its moving device.

25 Claims, 6 Drawing Sheets

(58) Field of Classification Search
USPC .............................................................. 701/3
See application file for complete search history.

(56) References Cited

U.S. PATENT DOCUMENTS

| | | | |
|---|---|---|---|
| 2012/0277934 A1 | 11/2012 | Ohtomo et al. | |
| 2017/0160740 A1* | 6/2017 | Srivastava | G01C 21/20 |
| 2017/0199038 A1* | 7/2017 | Baba | B64D 43/00 |
| 2018/0082308 A1* | 3/2018 | Gong | G08G 5/0008 |
| 2018/0341909 A1* | 11/2018 | Stuckman | G01S 19/14 |
| 2019/0196513 A1* | 6/2019 | Zhou | B64C 39/024 |

FOREIGN PATENT DOCUMENTS

| | | |
|---|---|---|
| JP | 2002323925 | 11/2002 |
| JP | 2009-009440 | 1/2009 |
| JP | 2012-232654 | 11/2012 |
| JP | 2014-89537 | 5/2014 |
| JP | 2016-94188 | 5/2016 |

\* cited by examiner

FIG. 4

| URL | Moving device identification information | Route data | Altitude data | Speed data | Condition data | Processing data |
|---|---|---|---|---|---|---|
| a | D001 | P1~P2 | H1 | S1 | Detect pest occurrence symptom | Spray pesticides |
| b | D002 | P1~P3 | H2 | S2 | None | Capture ground |
| c | D001 | P2~P4 | ... | ... | ... | ... |
| d | D001 | P4~P5 | ... | ... | ... | ... |
| ... | ... | ... | ... | ... | ... | ... |

MOVING DEVICE, MOVING DEVICE CONTROL METHOD, PROGRAM, AND MOVING DEVICE CONTROL SYSTEM

TECHNICAL FIELD

The present invention relates to a moving device, a moving device control method, and a program.

BACKGROUND ART

As a technique for controlling a moving device called a drone, for example, there is known in the art a system for wirelessly transmitting a control command to the moving device from a tablet operated by a user, disclosed in Patent Document 1.

PRIOR ART DOCUMENT

Patent Document

Patent Document 1: Japanese Patent Application Publication No. 2016-94188

SUMMARY OF THE INVENTION

Technical Problem

Use of the technique described in Patent Document 1 requires an operation of an operator for remotely controlling the moving device in real time. However, in the future, it is desirable for the moving device to autonomously control its operations even if the human does not give instructions in real time. An object of the present invention is to provide a technology capable of operating a moving device even if the operator does not remotely control the moving device in real time by the operation.

Technical Solution

The present invention provides a moving device including an image-capturing unit that captures an image representing moving device identification information for identifying a moving device and operation information for specifying an operation to be performed by the moving device, and an operation executing unit that acquires the moving device identification information and the operation information based on the captured image, and performs the operation specified by the operation information when the moving device identification information indicates its own moving device.

The operation information may include information for specifying an operation related to movement of the moving device.

The operation information may include information for specifying an operation to be performed on a surrounding environment by the moving device.

The operation information may include a condition and information for specifying an operation to be performed when the condition is satisfied. The operation executing unit may determine whether the condition specified by the operation information is satisfied, and perform the operation specified by the operation information when the condition is satisfied.

The operation information may include information for specifying a restriction of an operation of the moving device.

The operation information may include information for specifying an operation related to communication of the moving device.

The captured image may be an image into which the moving device identification information and the operation information are encoded.

The captured image may be an image into which the moving device identification information and an address at which the operation information is stored are encoded.

Further, the present invention provides a method of controlling a moving device including capturing an image representing moving device identification information for identifying a moving device and operation information for specifying an operation to be performed by the moving device, and acquiring the moving device identification information and the operation information based on the captured image, and performing the operation specified by the operation information when the moving device identification information indicates its own moving device.

Furthermore, the present invention provides a program for causing a computer included in a moving device to execute capturing an image representing moving device identification information for identifying a moving device and operation information for specifying an operation to be performed by the moving device, and acquiring the moving device identification information and the operation information based on the captured image, and performing an operation specified by the operation information when the moving device identification information indicates its own moving device.

In addition, the present invention provides a moving device control system including an acquiring unit that acquires a captured image representing moving device identification information for identifying a moving device and operation information for specifying an operation to be performed by the moving device, and a control unit that acquires the moving device identification information and the operation information based on the acquired captured image, and controls the moving device indicated by the moving device identification information to perform the operation specified by the operation information.

Moreover, the present invention provides a method of controlling a moving device including acquiring a captured image representing moving device identification information for identifying a moving device and operation information for specifying an operation to be performed by the moving device, and acquiring the moving device identification information and the operation information based on the acquired captured image, and controlling the moving device indicated by the moving device identification information to perform the operation specified by the operation information.

Besides, the present invention provides a program for causing a computer to execute acquiring a captured image representing moving device identification information for identifying a moving device and operation information for specifying an operation to be performed by the moving device, and acquiring the moving device identification information and the operation information based on the acquired captured image, and controlling the moving device indicated by the moving device identification information to perform the operation specified by the operation information.

Effects of the Invention

According to the present invention, a moving device can be operated without remote control of the moving device in real time by the operation of the operator.

BRIEF DESCRIPTION OF THE DRAWINGS

FIG. 4 is a diagram exemplifying information stored in an auxiliary storage device 104 of an operation information storage device 10.

DESCRIPTION OF REFERENCE NUMBERS

1: moving device control system, 10: operation information storage device, 11: operation information storage unit, 12: operation information transmitting unit, 20: moving device, 21: moving unit, 22: operation executing unit, 23: position detecting unit, 24: image-capturing unit, 25: image analyzing unit, 26: operation information requesting unit, 90: network, 101: CPU, 102: RAM, 103: ROM, 104: auxiliary storage device, 105: communication IF, 201: CPU, 202: RAM, 203: ROM, 204: auxiliary storage device, 205: communication IF, 206: camera, 207: sensor, 208: rotation mechanism, 209: processing mechanism.

DETAILED DESCRIPTION OF THE EMBODIMENTS

1. Configuration

Figure 1:
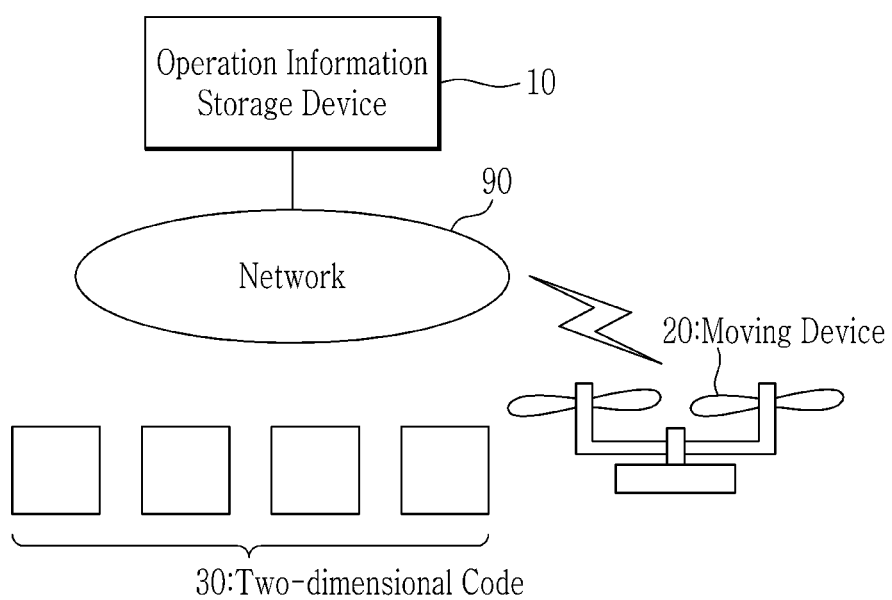
FIG. 1 is a diagram exemplifying an overview of a moving device control system 1 according to an embodiment of the present invention.

FIG. 1 is a diagram exemplifying an overview of a moving device control system 1 according to an embodiment of the present invention. The moving device control system 1 includes an operation information storage device 10, a moving device 20, a plurality of two-dimensional codes 30, and a network 90 for communicably connecting the operation information storage device 10 with the moving device 20. The network 90 is, for example, a LAN (Local Area Network), a WAN (Wide Area Network), or a combination thereof, and may include a wired section or a wireless section. The moving device 20 is a device that is movable and has an image-capturing function, and is a rotary-wing aircraft called a drone or a multicopter in the present embodiment.

The two-dimensional code is a code obtained by encoding moving device identification information that is identification information for identifying the moving device 20 and operation information for specifying an operation to be performed by the moving device 20. Here, an actual content of the operation information is stored in the operation information storage device 10, and the operation information encoded in the two-dimensional code indicates an address (storage location) on the network of the actual operation information stored in the operation information storage device 10. In other words, the address of the operation information encoded into the two-dimensional code and the operation information stored in the operation information storage device 10 mean substantially the same content. The two-dimensional code is, for example, attached to a structure in a sealed form, displayed on the structure in a printed form, or displayed by an optical display device, at a position where the moving device 20 should perform any operation.

Figure 2:
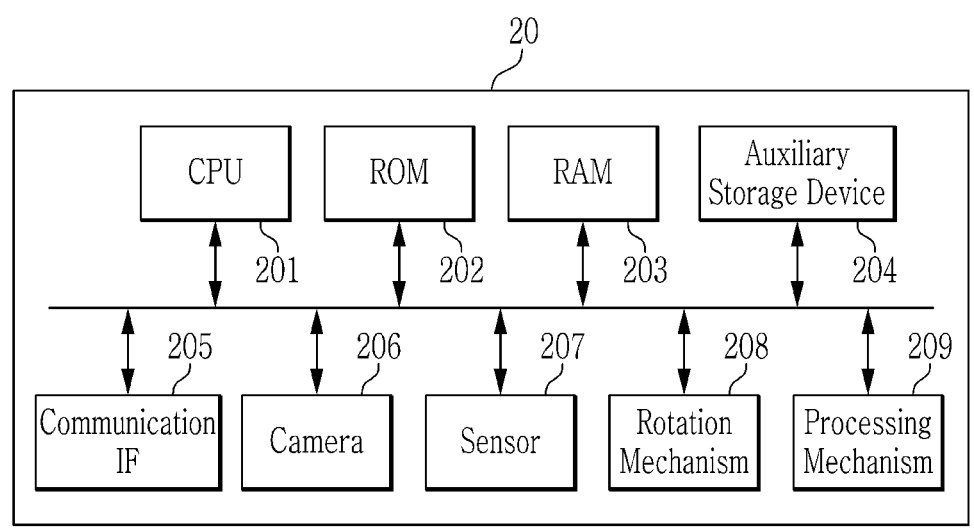
FIG. 2 is a diagram exemplifying a hardware configuration of a moving device 20.

FIG. 2 is a diagram exemplifying a hardware configuration of a moving device 20. The moving device 20 includes a CPU (Central Processing Unit) 201, a ROM (Read Only Memory) 202, a RAM (Random Access Memory) 203, an auxiliary storage device 204, a communication IF 205, a camera 206, a sensor 207, a rotation mechanism 208, and a processing mechanism 209. The CPU 201 is a processor that performs various operations. The RAM 202 is a volatile memory that functions as a work area when the CPU 201 executes a program. The ROM 203 is, for example, a non-volatile memory that stores a program and data used for starting the moving device 20. The auxiliary storage device 204 is, for example, a non-volatile storage device such as a hard disk drive (HDD) or a solid state drive (SSD) and stores a program and data used in the moving device 20. The CPU 201 executes the program so that the moving device 20 functions as a computer device and functions shown in FIG. 5 to be described below is implemented. In addition, the auxiliary storage device 204 stores, for example, moving device identification information assigned to the moving device 20. The communication IF 205 is an interface that performs communication via the network 90 in accordance with a predetermined communication standard. The communication standard may be a wireless communication standard or a wired communication standard. The camera 206 captures an image of, for example, a space vertically below the moving device 20, and generates image data indicating the captured image. The positioning device 207 is, for example, a GPS (Global Positioning System) unit, and detects a position of the moving device 20. The rotation mechanism 208 is means for generating lift force and propulsion force in the moving device 20, and includes a propeller, a shaft, a motor, and other driving mechanisms. The processing mechanism 209 is a mechanism for performing determined processing, and for example, includes a tank for storing pesticides and a spraying device for spraying the pesticides if the processing to be performed by the moving device 20 is pesticide spraying.

Figure 3:
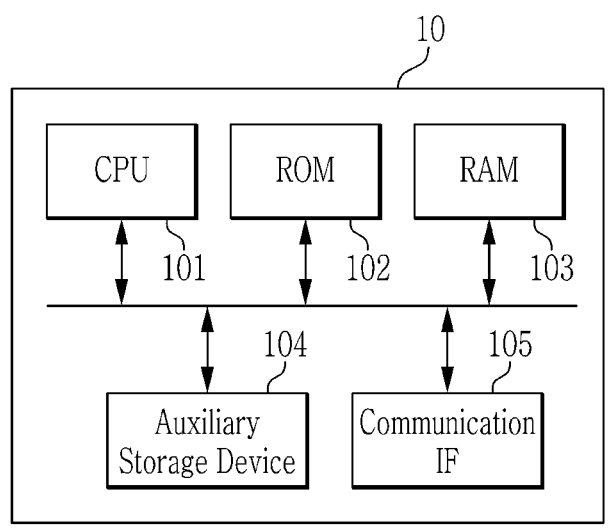
FIG. 3 is a diagram exemplifying a hardware configuration of an operation information storage device 10.

FIG. 3 is a diagram exemplifying a hardware configuration of an operation information storage device 10. The operation information storage device 10 is a computer device including a CPU 101, a ROM 102, a RAM 103, an auxiliary storage device 104, and a communication IF 105. The CPU 101 is a processor that performs various operations. The RAM 102 is a volatile memory that functions as a work area when the CPU 101 executes a program. The ROM 103 is, for example, a non-volatile memory that stores a program and data used for starting the operation information storage device 10. The auxiliary storage device 104 is, for example, a non-volatile storage device such as an HDD or an SSD and stores a program and a plurality of operation information. The CPU 101 executes the program thereby implementing functions shown in FIG. 5 to be described below. The operation information indicates a content of an actual operation to be performed by a moving device 20. The communication IF 105 is an interface that performs communication via a network 90 in accordance with a predetermined communication standard.

FIG. 4 is a diagram exemplifying information stored in an auxiliary storage device 104 of an operation information storage device 10. In the auxiliary storage device 104, moving device identification information, route data, altitude data, speed data, condition data, and processing data are stored and associated with each URL (Uniform Resource Locator) corresponding to an address of operation information on a network. The route data, the altitude data, the speed data, the condition data, and the processing data are operation information for specifying an operation to be performed by a moving device 20, and indicate an actual content of the operation. The route data, the altitude data, and the speed data are operation information for specifying an operation related to movement of the moving device 20. The processing data is operation information for specifying an operation which the moving device 20 performs on the surrounding environment. The condition data is operation information for specifying a condition under which the moving device 20 operates.

In the example of FIG. 4, it is stored in the URL "a" that the moving device 20 having the moving device identification information D001 moves along a route represented by the route data P1 to P2 at an altitude of the altitude data H1 and a speed of the speed data S1, and sprays pesticides (processing data) when a pest occurrence symptom is detected by analyzing an image captured by a camera while moving (condition data). Further, feature data such as the shape, color, and size of an object in an image of a plant where pest occurrence has occurred is stored in the auxiliary storage device 104, in order to detect the pest occurrence symptom from the captured image. The moving device 20 or the operation information storage device 10 determines the presence or absence of the pest occurrence symptom by calculating the similarity between the captured image and the feature data. In addition, it is stored in the URL "b" that the moving device 20 having the moving device identification information D002 moves along a route represented by the route data P1 to P3 at an altitude of the altitude data H2 and a speed of the speed data S2, and captures the ground by the camera 206 and stores a captured image while moving (processing data).

The moving device identification information and the operation information stored in the auxiliary storage device 104 can be appropriately updated by a user who wants to control the operation of the moving device 20. For example, the user accesses the operation information storage device 10 using a communication terminal operated by the user, and updates the moving device identification information and the operation information stored in the auxiliary storage device 104 by the operation of the user.

Figure 5:
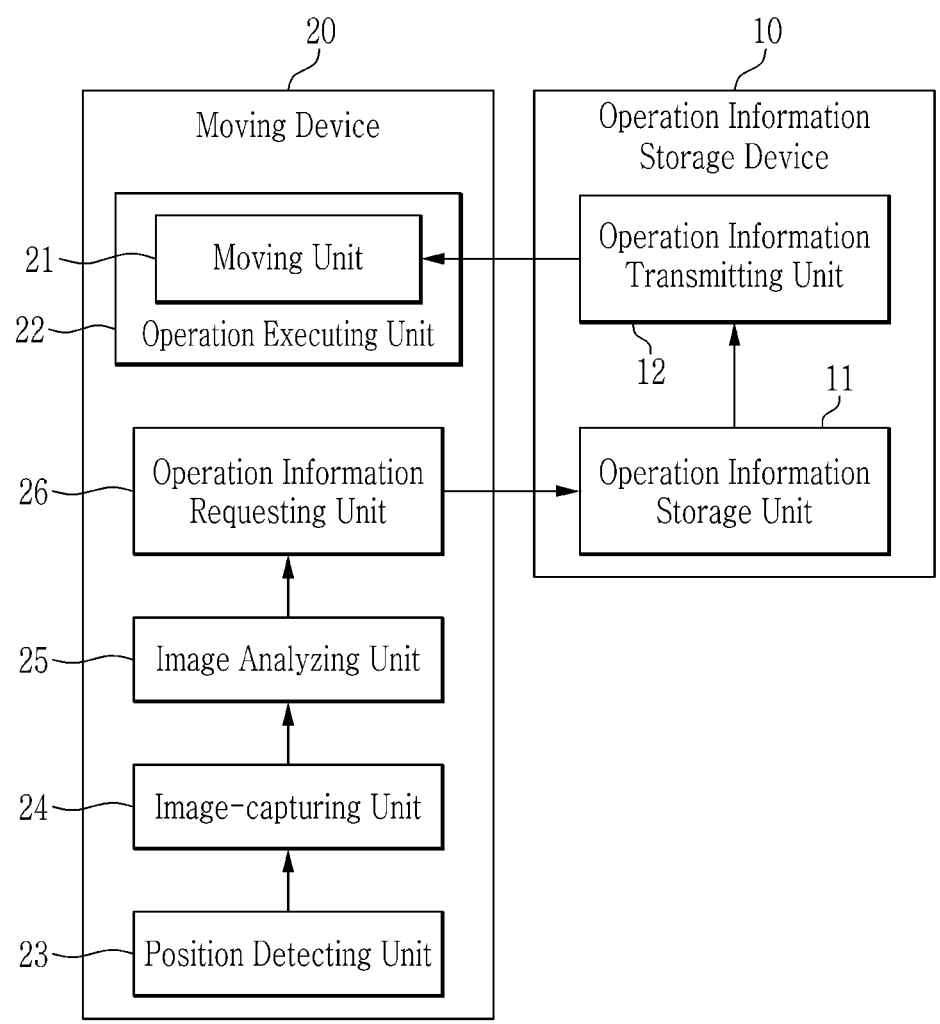
FIG. 5 is a diagram exemplifying a functional configuration of a moving device control system 1.

FIG. 5 is a diagram exemplifying a functional configuration of a moving device control system 1. The moving device control system 1 includes an operation executing unit 22 including a moving unit 21, a position detecting unit 23, an image-capturing unit 24, an image analyzing unit 25, an operation information requesting unit 26, an operation information storage unit 11, and an operation information transmitting unit 12. In this example, the operation executing unit 22, the position detecting unit 23, the image-capturing unit 24, the image analyzing unit 25, and the operation information requesting unit 26 are mounted in the moving device 20, and the operation information storage unit 11 and the operation information transmitting unit 12 are mounted in the operation information storage device 10.

The moving unit 21 is implemented by a rotation mechanism 208 of the moving device 20, and the operation executing unit 22 is implemented by a CPU 201, a camera 206, the rotation mechanism 208 and a processing mechanism 209 of the moving device 20. The position detecting unit 23 is implemented by a positioning device of the moving device 20, and the image-capturing unit 23 is implemented by a camera 206 of the moving device 20. The image analyzing unit 25 is implemented by the CPU 201 of the moving device 20, and the operation information requesting unit 26 is implemented by a communication IF 205 of the moving device 20. The operation information storage unit 11 is implemented by an auxiliary storage device 104 of the operation information storage device 10, and the operation information transmitting unit 12 is implemented by a communication IF 105 of the operation information storage device 10.

The moving unit 21 moves the moving device 20. The position detecting unit 23 detects a position of the moving device 20. The image-capturing unit 24 is a unit that performs image-capturing, and for example, captures an image of a two-dimensional code indicating moving device identification information and an address of operation information for specifying actual operation information when the position detected by the position detecting unit 23 reaches a predetermined position. The image analyzing unit 25 analyzes the captured image and acquires the moving object identification information and the address of the operation information. The operation information requesting unit 26 designates the address of the operation information to request the operation information storage device 10 for the actual operation information. The operation information storage unit 11 stores the actual operation information, and the operation information transmitting unit 22 transmits the actual operation information to the moving device 20 in response to the request from the operation information requesting unit 26. The operation executing unit 22 acquires the moving device identification information and the actual operation information based on the captured image, and performs the operation specified by the operation information when the moving device identification information indicates its own moving device. If the moving device identification information does not indicate its own moving device, the operation specified by the operation information is not performed.

2. Operation

Figure 6:
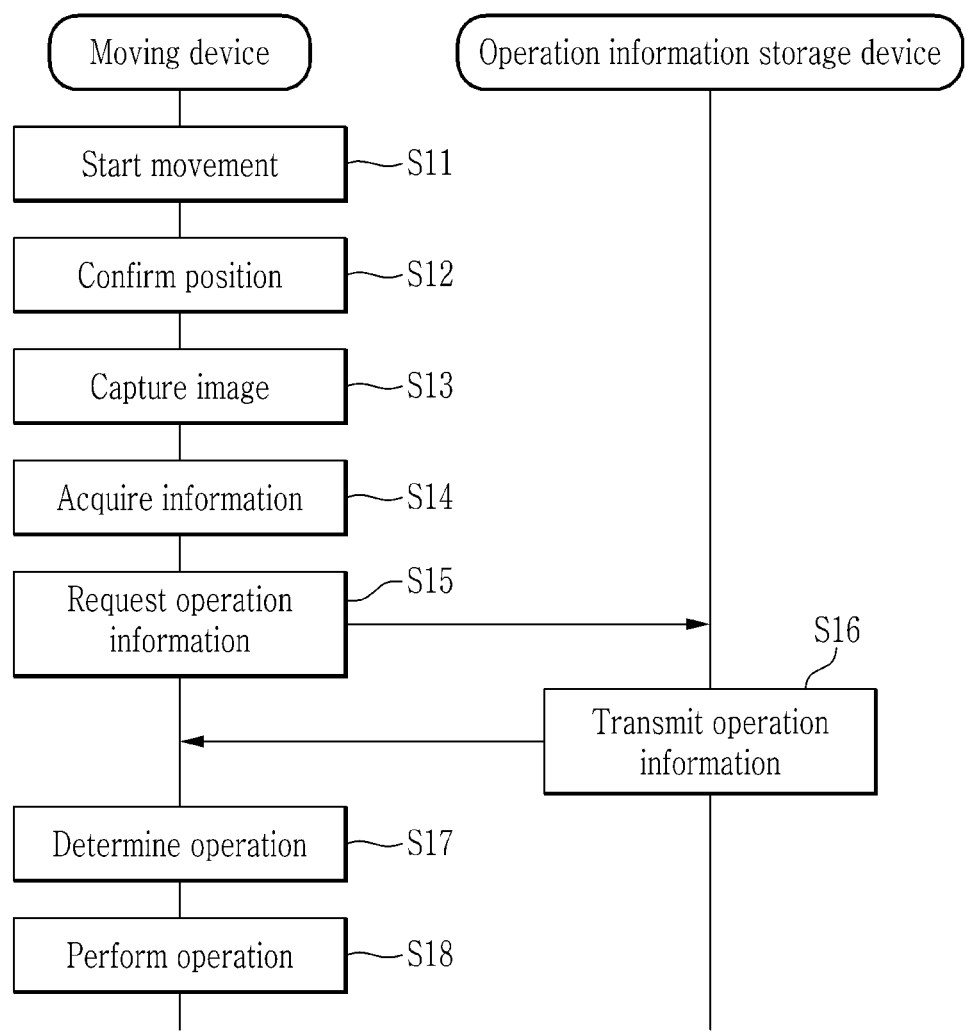
FIG. 6 is a flowchart exemplifying an operation of a moving device control system 1.

FIG. 6 is a flowchart exemplifying an operation of a moving device control system 1. In FIG. 6, a moving unit 21 of a moving device 20 drives a rotation mechanism 208 to take off from a predetermined base facility and move the moving device 20 to a destination, in accordance with an instruction given in advance (step S11). The instruction includes position information indicating a position of a two-dimensional code to be captured first, and the moving unit 21 moves the moving device 20 to the position as a destination.

A position detecting unit 22 periodically detects a position of the moving device 20. The moving unit 21 confirms that the position detected by the position detecting unit 22 matches the position indicated by the position information (step S12). In response to the confirmation, an image-capturing unit 24 searches for a two-dimensional code while performing image-capturing, and captures the two-dimensional code found as a result of the search and stores the captured image (step S13).

An image analyzing unit 25 analyzes the two-dimensional code included in the captured image that has been captured, and acquires moving object identification information and an address of operation information (step S14). When the acquired moving device identification information matches moving device identification information stored in an auxiliary storage device 204, an operation information requesting unit 26 determines that it is an instruction of an operation for its own moving device 20, and designates the acquired address of the operation information to request the operation information (step S15).

In response to the request, an operation information transmitting unit 12 of an operation information storage device 10 reads operation information from the designated address in an operation information storage unit 11, and transmits it to the moving device 20 (step S16). Upon acquiring the operation information, an operation executing unit 22 of the moving device 20 interprets the operation information to determine a content of an operation of the moving device 20 (step S17), and performs the operation (step S18).

For example, in the example of FIG. 4, the moving device 20 having the moving device identification information D001 moves along a route represented by the route data P1 to P2 at an altitude of the altitude data H1 and a speed of the speed data S1, and sprays pesticides when a pest occurrence symptom is detected by analyzing an image captured by a camera while moving. When the moving device 20 reaches a position P2, a two-dimensional code for specifying a next operation of the moving device 20 is disposed at the position P2, and the operation executing unit 22 of the moving device 20, similarly to the above, acquires moving device identification information and actual operation information based on a captured image, and performs an operation specified by the operation information when the moving device identification information indicates its own moving device.

According to the present embodiment described above, the moving device 20 can analyze the two-dimensional codes and operate autonomously simply by arranging the two-dimensional codes including the operation information for specifying the operation at various places. In addition, since the two-dimensional code includes the moving device identification information for identifying the moving device 20, it is possible to cause each moving device 20 to perform different operations. Further, it is possible to prevent a situation in which a third party who does not know the moving device identification information forges the two-dimensional code to cause the moving device 20 to perform an unauthorized operation. Because the operation information stored in the auxiliary storage device 104 of the information storage device 10 can be appropriately updated by the user who wants to control the operation of the moving device 20, the operation of the moving device 20 accessing the operation information of the auxiliary storage device 104 can be changed by updating the operation information to a desired content. Furthermore, it is possible to use in a form, for example, such as a form of designating a next operation at a position where the mobile unit 20 will arrive in the future, like causing the moving device 20 to perform a certain operation while moving the moving device 20 along the route represented by the route data P1 to P2, causing the moving device 20 to perform another operation while moving the moving device 20 along the route represented by the route data P2 to P4 when the moving device 20 arrives at the position P2, and causing the moving device 20 to perform further operation while moving the moving device 20 along the route represented by the route data P4 to P5 when the moving device 20 arrives at the position P4.

3. Modified Examples

The present invention is not limited to the above-described embodiments, and various modified examples are possible. Several modified examples are described below. Two or more of the following modified example may be combined for use.

3-1. Modified Example 1

In an embodiment, the actual content of the operation information is stored in the operation information storage device 10, and the address of the operation information is encoded into the two-dimensional code. However, the actual operation information itself may be encoded into the two-dimensional code. In this case, the operation information storage device 10 is not essential. Further, since the moving device 20 does not need to communicate with the operation information storage device 10, the moving device 20 can operate autonomously even in an area where communication is difficult, for example, such as an area where a wireless base station is not established.

3-2. Modified Example 2

The captured image indicating the moving object identification information and the operation information is not limited to the image of the two-dimensional code, and may be any image. For example, instead of the two-dimensional code, the moving device identification information and the operation information may be encoded by a lighting pattern in which at least one of various lighting conditions such as lighting timing, lighting period, lighting intensity, lighting position or lighting color of one or more installed light sources is different. The moving device 20 specifies a lighting pattern from a still image or moving image obtained by capturing the light source, and acquires the moving device identification information and the operation information based on the specified lighting pattern.

3-3. Modified Example 3

The operation information may be any information as long as it is information for specifying an operation to be performed by the moving device 20. For example, the operation information may include information for specifying a restriction of the operation of the moving device 20. Specifically, as the information related to the restriction of the operation of the moving device 20, it is conceivable that the operation information includes a range of position and an instruction to prohibit an entry of the moving device 20 in this range, or includes a range of position and an indication of an upper limit of the altitude or speed of the moving device 20. Further, the operation information may include information for specifying an operation related to communication of the moving device 20. For example, it is conceivable that the operation information includes a range of position and designation of a frequency band used for communication in this range. Furthermore, the condition data included in the operation information may be data for designating conditions (for example, temperature, humidity, and precipitation) related to the natural environment. In this case, the moving device 20 acquires values (temperature, humidity, precipitation) related to the natural environment designated by the conditions from, for example, a sensor provided on the moving device 20 or a sensor installed on the ground, and performs an operation designated by the operation information if the values satisfy the above conditions.

3-4. Modified Example 4

The moving device in the present invention is not limited to the moving device 20 flying in the air like the rotary-wing aircraft exemplified in an embodiment, and may be, for example, a moving device moving on the ground or under water.

3-5. Other Modified Examples

A part of the functional configuration exemplified in FIG. 5 may be omitted. For example, the operation information storage 11 may be provided by an external computer device other than the moving device control system 1. Further, the function assignment between the operation information storage device 10 and the moving device 20 is not limited to one exemplified in FIG. 5. In the embodiment, some of the functions implemented in the operation information storage device 10 may be implemented in the moving device 20. Further, a computer device group that physically consists of a plurality of devices may function as the operation information storage device 10 in the moving device control system 1.

The present invention can be understood as a moving device control system depending on a mode of the function assignment between the movement information storage device 10 and the moving device 20. In other words, the moving device control system according to the present invention includes an acquiring unit that acquires a captured image representing moving device identification information for identifying a moving device and operation information for specifying an operation to be performed by the moving device, and a control unit that acquires the moving device identification information and the operation information based on the captured image and controls the moving device indicated by the moving device identification information to perform the operation specified by the operation information. The acquiring unit is implemented, for example, by the communication IF 105 of the operation information storage device 10 shown in FIG. 3, and the control unit is implemented, for example, by the CPU 101 of the operation information storage device 10 shown in FIG. 3. The acquiring unit acquires captured image data captured by the moving device 20. The control unit analyzes the captured image to obtain moving device identification information and operation information, and causes the moving device to perform the operation specified by the operation information if the moving device identification information indicates the moving device that is a transmission source of the captured image data. On the other hand, the control unit does not cause the moving device to perform the operation specified by the operation information if the moving device identification information does not indicate the moving device that is the transmission source of the captured image data.

Further, the acquiring unit is implemented, for example, by the CPU 201 of the moving device 20 shown in FIG. 2, and the control unit is implemented, for example, by the CPU 201 of the moving device 20 shown in FIG. 2 and the CPU 101 of the operation information storage device 10 shown in FIG. 3. The acquiring unit acquires captured image data captured by the camera 206. The control unit (the CPU 201 of the moving device 20) analyzes the captured image to obtain moving device identification information and operation information, and transmits the operation information to the operation information storage device 10 if the moving device identification information indicates its own moving device. The control unit (the CPU 101 of the operation information storage device 10) causes the moving device to perform the operation specified by the operation information. On the other hand, the control unit (the CPU 201 of the moving device 20) analyzes the captured image to obtain moving device identification information and operation information, and does not transmit the operation information to the operation information storage device 10 if the moving device identification information does not indicate its own moving device.

Programs executed by the CPU 101, the CPU 201, and the like may be provided by a storage medium such as an optical disc, a magnetic disc, or a semiconductor memory, or may be downloaded via a communication line such as the Internet. In addition, the programs may not execute all the steps described in an embodiment.

What is claimed is:

1. A moving device comprising:
an image-capturing unit that captures an image representing moving device identification information for identifying a moving device and operation information for specifying an operation to be performed on a surrounding environment by the moving device; and
an operation executing unit that acquires the moving device identification information and the operation information based on the captured image, and performs the operation specified by the operation information when the moving device identification information indicates its own moving device.

2. A moving device comprising:
an image-capturing unit that captures an image representing moving device identification information for identifying a moving device and operation information for specifying a condition and an operation to be performed by the moving device when the condition is satisfied; and
an operation executing unit that acquires the moving device identification information and the operation information based on the captured image, and performs the operation specified by the operation information when the moving device identification information indicates its own moving device and the condition specified by the operation information is satisfied.

3. A moving device comprising:
an image-capturing unit that captures an image representing moving device identification information for identifying a moving device and operation information for specifying a restriction of an operation of the moving device; and
an operation executing unit that acquires the moving device identification information and the operation information based on the captured image, and performs the operation specified by the operation information when the moving device identification information indicates its own moving device.

4. A moving device comprising:
an image-capturing unit that captures an image representing moving device identification information for identifying a moving device and operation information for specifying an operation related to communication of the moving device; and
an operation executing unit that acquires the moving device identification information and the operation information based on the captured image, and performs the operation specified by the operation information when the moving device identification information indicates its own moving device.

5. A moving device comprising:
an image-capturing unit that captures an image into which moving device identification information for identifying a moving device and operation information for specifying an operation to be performed by the moving device are encoded or an image into which the moving device identification information and an address at which the operation information is stored are encoded; and an operation executing unit that acquires the moving device identification information and the operation information based on the captured image, and performs the operation specified by the operation information when the moving device identification information indicates its own moving device.

6. A method of controlling a moving device, comprising:
capturing an image representing moving device identification information for identifying a moving device and operation information for specifying an operation to be performed on a surrounding environment by the moving device; and
acquiring the moving device identification information and the operation information based on the captured image, and performs the operation specified by the operation information when the moving device identification information indicates its own moving device.

7. A method of controlling a moving device, comprising:
capturing an image representing moving device identification information for identifying a moving device and operation information for specifying a condition and an operation to be performed by the moving device when the condition is satisfied; and
acquiring the moving device identification information and the operation information based on the captured image, and performs the operation specified by the operation information when the moving device identification information indicates its own moving device and the condition specified by the operation information is satisfied.

8. A method of controlling a moving device, comprising:
capturing an image representing moving device identification information for identifying a moving device and operation information for specifying a restriction of an operation of the moving device; and
acquiring the moving device identification information and the operation information based on the captured image, and performs the operation specified by the operation information when the moving device identification information indicates its own moving device.

9. A method of controlling a moving device, comprising:
capturing an image representing moving device identification information for identifying a moving device and operation information for specifying an operation related to communication of the moving device; and
acquiring the moving device identification information and the operation information based on the captured image, and performs the operation specified by the operation information when the moving device identification information indicates its own moving device.

10. A method of controlling a moving device, comprising:
capturing an image into which moving device identification information for identifying a moving device and operation information for specifying an operation to be performed by the moving device are encoded or an image into which the moving device identification information and an address at which the operation information is stored are encoded; and
acquiring the moving device identification information and the operation information based on the captured image, and performs the operation specified by the operation information when the moving device identification information indicates its own moving device.

11. A program for causing a computer included in a moving device to execute:
capturing an image representing moving device identification information for identifying a moving device and operation information for specifying an operation to be performed on a surrounding environment by the moving device; and
acquiring the moving device identification information and the operation information based on the captured image, and performs the operation specified by the operation information when the moving device identification information indicates its own moving device.

12. A program for causing a computer included in a moving device to execute:
capturing an image representing moving device identification information for identifying a moving device and operation information for specifying a condition and an operation to be performed by the moving device when the condition is satisfied; and
acquiring the moving device identification information and the operation information based on the captured image, and performs the operation specified by the operation information when the moving device identification information indicates its own moving device and the condition specified by the operation information is satisfied.

13. A program for causing a computer included in a moving device to execute:
capturing an image representing moving device identification information for identifying a moving device and operation information for specifying a restriction of an operation of the moving device; and
acquiring the moving device identification information and the operation information based on the captured image, and performs the operation specified by the operation information when the moving device identification information indicates its own moving device.

14. A program for causing a computer included in a moving device to execute:
capturing an image representing moving device identification information for identifying a moving device and operation information for specifying an operation related to communication of the moving device; and
acquiring the moving device identification information and the operation information based on the captured image, and performs the operation specified by the operation information when the moving device identification information indicates its own moving device.

15. A program for causing a computer included in a moving device to execute:
capturing an image into which moving device identification information for identifying a moving device and operation information for specifying an operation to be performed by the moving device are encoded or an image into which the moving device identification information and an address at which the operation information is stored are encoded; and
acquiring the moving device identification information and the operation information based on the captured image, and performs the operation specified by the operation information when the moving device identification information indicates its own moving device.

16. A moving device control system comprising:
an acquiring unit that acquires an image representing moving device identification information for identifying a moving device and operation information for specifying an operation to be performed on a surrounding environment by the moving device; and a control unit that acquires the moving device identification information and the operation information based on the captured image, and controls the moving device indicated by the moving device identification information to perform the operation specified by the operation information.

17. A moving device control system comprising:

an acquiring unit that acquires an image representing moving device identification information for identifying a moving device and operation information for specifying a condition and an operation to be performed by the moving device when the condition is satisfied; and a control unit that acquires the moving device identification information and the operation information based on the captured image, and controls the moving device indicated by the moving device identification information to perform the operation specified by the operation information when the condition specified by the operation information is satisfied.

18. A moving device control system comprising:

an acquiring unit that acquires an image representing moving device identification information for identifying a moving device and operation information for specifying a restriction of an operation of the moving device; and a control unit that acquires the moving device identification information and the operation information based on the captured image, and controls the moving device indicated by the moving device identification information to perform the operation specified by the operation information.

19. A moving device control system comprising:

an acquiring unit that acquires an image representing moving device identification information for identifying a moving device and operation information for specifying an operation related to communication of the moving device; and a control unit that acquires the moving device identification information and the operation information based on the captured image, and controls the moving device indicated by the moving device identification information to perform the operation specified by the operation information.

20. A moving device control system comprising:

an acquiring unit that acquires an image into which moving device identification information for identifying a moving device and operation information for specifying an operation to be performed by the moving device are encoded or an image into which the moving device identification information and an address at which the operation information is stored are encoded; and a control unit that acquires the moving device identification information and the operation information based on the captured image, and controls the moving device indicated by the moving device identification information to perform the operation specified by the operation information.

21. A program for causing a computer to execute:

acquiring an image representing moving device identification information for identifying a moving device and operation information for specifying an operation to be performed on a surrounding environment by the moving device; and acquiring the moving device identification information and the operation information based on the captured image, and controlling the moving device indicated by the moving device identification information to perform the operation specified by the operation information.

22. A program for causing a computer to execute:

acquiring an image representing moving device identification information for identifying a moving device and operation information for specifying a condition and an operation to be performed by the moving device when the condition is satisfied; and acquiring the moving device identification information and the operation information based on the captured image, and controlling the moving device indicated by the moving device identification information to perform the operation specified by the operation information when the condition specified by the operation information is satisfied.

23. A program for causing a computer to execute:

acquiring an image representing moving device identification information for identifying a moving device and operation information for specifying a restriction of an operation of the moving device; and acquiring the moving device identification information and the operation information based on the captured image, and controlling the moving device indicated by the moving device identification information to perform the operation specified by the operation information.

24. A program for causing a computer to execute:

acquiring an image representing moving device identification information for identifying a moving device and operation information for specifying an operation related to communication of the moving device; and acquiring the moving device identification information and the operation information based on the captured image, and controlling the moving device indicated by the moving device identification information to perform the operation specified by the operation information.

25. A program for causing a computer to execute:

acquiring an image into which moving device identification information for identifying a moving device and operation information for specifying an operation to be performed by the moving device are encoded or an image into which the moving device identification information and an address at which the operation information is stored are encoded; and acquiring the moving device identification information and the operation information based on the captured image, and controlling the moving device indicated by the moving device identification information to perform the operation specified by the operation information.

* * * * *